April 9, 1968  G. S. BLACKMAN  3,377,114
COMBINATION FOLDING CHAIR AND TACKLE BOX
Filed Feb. 23, 1966

George S. Blackman
INVENTOR

BY John C. Stahl
ATTORNEY

United States Patent Office 3,377,114
Patented Apr. 9, 1968

3,377,114
COMBINATION FOLDING CHAIR
AND TACKLE BOX
George S. Blackman, 467 Hub,
San Antonio, Tex. 78220
Filed Feb. 23, 1966, Ser. No. 532,525
4 Claims. (Cl. 312—235)

ABSTRACT OF THE DISCLOSURE

A folding chair including a tackle box pivotally mounted in the frame thereof; a door connected to said frame when in closed condition abuts the tackle box and secures the contents therein; in open condition the said door serves as a platform for the fisherman.

---

The present invention relates to a combination folding chair and tackle box and more particularly to a portable chair wherein a fishing tackle box is housed in the frame of said chair.

An object of the present invention is the provision of a combination folding chair and fishing tackle box wherein said tackle box is mounted in a portion of the frame of said folding chair.

Another object is to provide such a piece of sporting equipment which is light weight and may easily be carried by a fisherman and may conveniently be stored when not in use.

A further object is to provide such a combination folding chair and tackle box wherein the fisherman has access to the contents of such tackle box without getting off the chair.

Still another object is the provision of such a device which is inexpensive to manufacture, capable of mass production techniques, and universal in its adaptability.

Other objects and features of the invention will become apparent to those skilled in the art as the disclosure is made in the following detailed description of a preferred embodiment of the invention as illustrated in the accompanying sheet of drawing in which.

Figure 1:
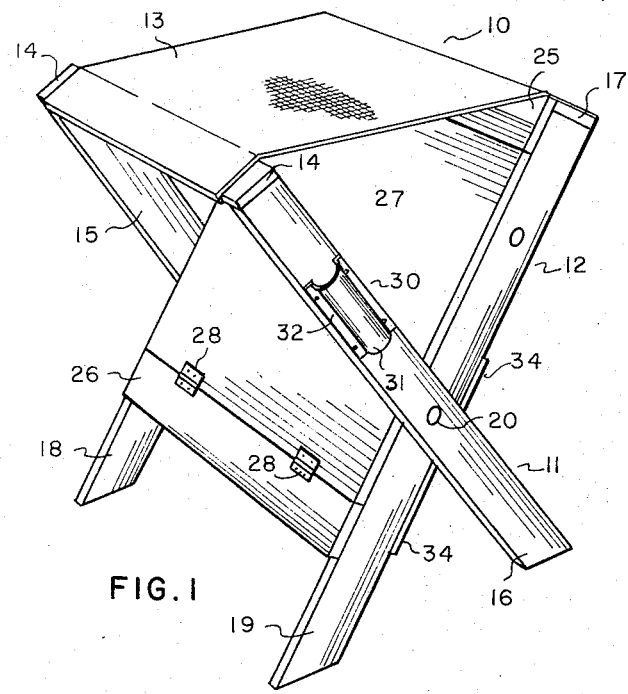
FIG. 1 is a pictorial view of the subject invention.

Referring now to the drawings, wherein like reference characters designate like or corresponding parts throughout the several views, the collapsible fisherman's chair 10 of the subject invention includes a pair of inverted U-shaped frames 11–12 which are pivotally connected and to which is secured a canvas seat 13 in a manner hereinafter to be described. More particularly, frame 11 includes a horizontally disposed top 14 and vertical sides 15–16 secured to the most lateral ends of top 14 in a conventional manner; frame 12 fits inwardly of the corresponding portions of frame 11 (see FIG. 3) and includes a horizontal top 17 and vertical sides 18–19 conventionally secured to the lateral ends of top 17. A bolt 20 passes through aligned bores 21–22 (see FIG. 3) in the approximate center of sides 15, 18 and 16, 19 respectively; a washer 23 is placed thereon secured by nut 24 inwardly of sides 18, 19. Such construction permits chair 10 to be conveniently folded when not in use, as illustrated in FIG. 2, and at the same time permits the same to be opened up to provide a comfortable seat for use in fishing or other purposes, as illustrated in FIG. 1.

Figure 2:
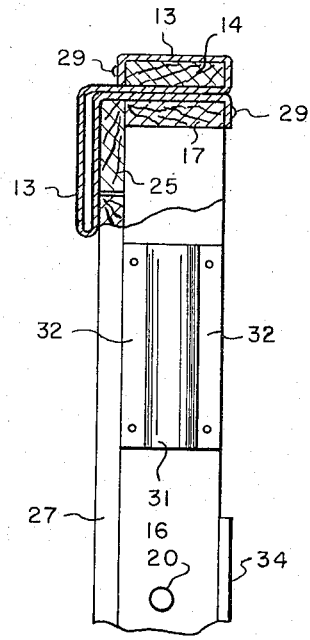
FIG. 2 is a fragmentary, enlarged, side elevational view, partly broken away and partly in section, of the upper portion of the subject invention.
Figures 3, 4:
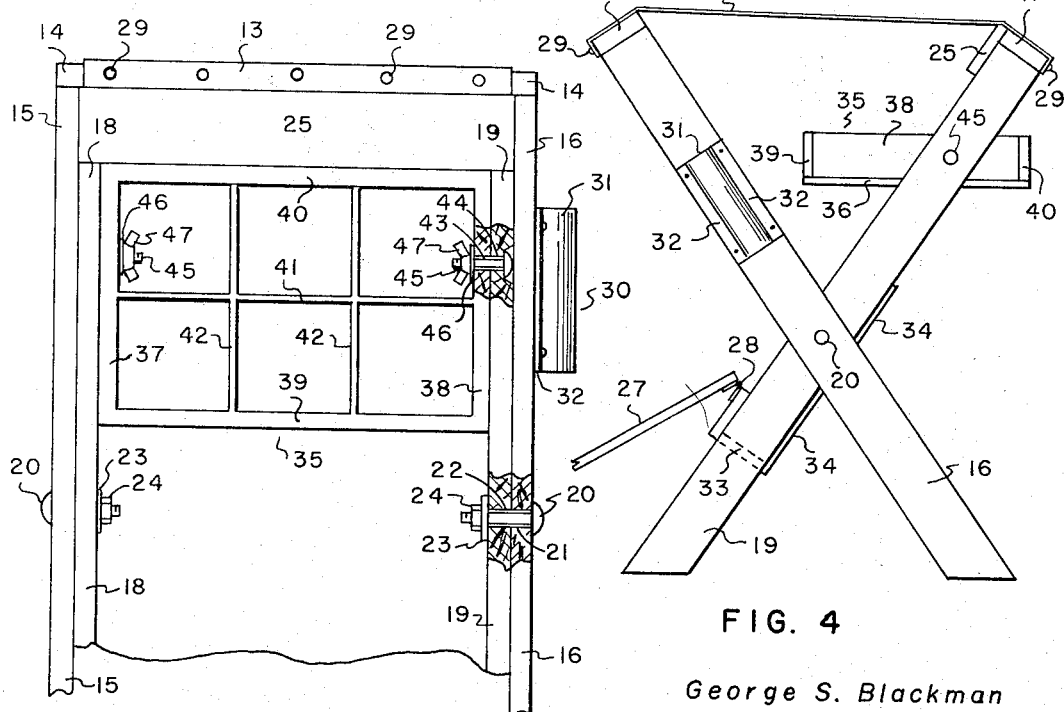
FIG. 3 is a fragmentary, enlarged, front elevational view, partly broken away and partly in section, of the upper portion of the subject invention, with the tray folded downwardly.
FIG. 4 is a side elevational view, showing the door in open condition and the tray locked at a desired angle of inclination.

As best seen in FIGS. 1 and 3 of the drawings, a horizontally disposed, rectangular piece 25 is secured to the foremost ends of sides 18, 19 and abuts the foremost end of top 17. A horizontally extending rectangular piece 26, similar to piece 25, is secured to the foremost ends of sides 18, 19 intermediate bolt 20 and the lower ends of the respective sides. A door 27 connects to piece 26 as by hinges 28; when such door is in closed condition the said door overlaps sides 18, 19 and the upper end of said door terminates slightly below the lower end of piece 25. Conventional securing means (not shown) may be utilized to maintain such door in closed and/or locked condition.

One end of canvas seat 13, heretofore mentioned, is secured to the foremost end of top 14 by tacks 29 or other securing means; the other end of seat 13 is passed over top 17 and preferably secured to the rearmost end thereof as by tacks 29 or the like.

An elongated holder 30, preferably of rust resistant metal, is secured to either or both of sides 15, 16 of frame 11, such holder accommodates the handle of a fishing pole or rod inserted therein. More specifically, holder 30 is integrally formed, the center 31 of which is U-shaped in horizontal section with laterally extending parts 32 by which such holder is secured in a conventional manner to the selected side or sides of frame 11.

Referring now to FIG. 4, horizontal piece 33 extends between sides 18, 19; the lower end of said piece 33 aligns with the lower end of piece 26. A rectangular panel 34 is secured to the respective rear ends of sides 18, 19 and piece 33, such panel terminates upwardly slightly above the horizontal plane of bolt 20 (see FIG. 2).

In FIGS. 3 and 4 of the drawings there is shown a tray 35 which is rotatably mounted in frame 12, such tray is generally rectangular in plan and consists of bottom 36, ends 37–38, sides 39–40, longitudinal divider 41, and transverse partitions 42, forming a plurality of compartments within such tray. Horizontally extending bore 43 is provided through ends 37, 38 of the tray with an aligned bore 44 in the adjacent sides 18, 19 of frame 12 through which bore is passed a bolt 45 with a washer and nut 47 threaded thereon. When chair 10 is in closed condition, the bottom 36 of such tray abuts the uppermost end of panels 34. At such time, the inner surface of door 27 bears against the upper surface of the sides, ends, partition and dividers thereby maintaining the contents in each respective compartment.

When chair 10 is to be used, the chair is first opened up by pulling frames 11, 12 apart after which door 27 is opened. Nut 47 may then be loosened whereby tray 35 may be rotated and locked at a desired angle of inclination by means of such nut. The fisherman has access to the fishing equipment or the like normally carried in the tray.

In use, such chair is often used in marshy or especially moist sand and soil; under such conditions the lower ends of the sides normally sink into such sand or soil. Door 27 not only provides a dry platform upon which the fisherman may stand or place his feet but also may be used to place fishing equipment or the like thereon.

As shown in FIG. 2 of the drawings, when chair 10 is folded preparatory to carrying or packing, the canvas seat 13 is secured between tops 14 and 17. More specifically, as the frames 11, 12 are folded the canvas seat extends downwardly against the foremost surfaces of piece 25 and door 27. As the frame 11 passes outwardly of top 17 the canvas seat 13 passes between the lower surface of top 14 and the upper surface of top 17 securing such canvas seat therebetween, as illustrated in FIG. 2 of the drawings.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A foldable chair comprising first and second inverted U-shaped frame, each frame consisting of a first and second vertical sides and a horizontally extending top, the respective first sides and second sides of said frame pivotally connected, a canvas seat secured to the said horizontally extending top of said first and second frames, a tray rotatably mounted between said first and second sides of said second frame, and means secured to at least one side of said first frame to secure the handle of a fishing pole therein.

2. A foldable chair comprising first and second inverted U-shaped frame, each frame consisting of a first and second vertically extending sides and a horizontally extending top therebetween, the respective first sides and second sides of the said frame pivotally connected, a canvas seat secured to said horizontally extending top of said first and second frames, a cross piece secured to the first and second sides of said second frame, a door pivotally connected to said cross piece, means maintaining said door in closed condition, and a tray pivotally mounted between between said first and second sides of said second frame.

3. A foldable chair comprising first and second inverted U-shaped frame, each frame consisting of a first and second vertically extending sides and a horizontally extending top therebetween, the respective first sides and second sides of said frames pivotally connected, a seat secured to said horizontally extending top of said first and second frames, a first cross piece secured between said first and second sides of said second frame and abutting the top thereof, a second piece secured between said first and second sides of said second frame, a door hingedly connected to said second cross pieces, and a tray rotatably mounted in said second frame.

4. The invention of claim 3 including means secured to at least one side of said first frame to secure the handle of a fishing pole therein.

References Cited

UNITED STATES PATENTS

| | | | |
|---|---|---|---|
| 2,031,119 | 2/1936 | Moreland | 297—188 |
| 2,264,744 | 12/1941 | Dunnam | 312—235 |
| 2,493,084 | 1/1950 | Pharo | 312—235 X |
| 3,116,046 | 12/1963 | Risdon | 297—188 X |
| 3,128,137 | 4/1964 | Dokter | 312—244 X |
| 3,189,380 | 6/1965 | Roguitti | 312—235 X |

CASMIR A. NUNBERG, *Primary Examiner.*